United States Patent
Tin

(10) Patent No.: US 7,365,755 B2
(45) Date of Patent: Apr. 29, 2008

(54) BLACK ENHANCEMENT IN PERCEPTUAL GAMUT MAPPING

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 169 days.

(21) Appl. No.: 11/400,549

(22) Filed: Apr. 7, 2006

(65) Prior Publication Data

US 2007/0236506 A1    Oct. 11, 2007

(51) Int. Cl.
  *G09G 5/02* (2006.01)
  *G06K 9/00* (2006.01)
  *G06F 15/00* (2006.01)
  *G06T 11/00* (2006.01)
  *H04N 1/60* (2006.01)
  *H04N 5/455* (2006.01)

(52) U.S. Cl. ............ 345/590; 345/589; 345/591; 382/162; 382/166; 382/167; 358/1.9; 358/516; 358/519

(58) Field of Classification Search ........ 345/589–593, 345/596, 600, 606, 616–617, 660, 690; 382/162–167; 358/1.6, 1.9, 515–520, 529; 348/577, 582, 348/592, 612, 615, 649, 655, 703
See application file for complete search history.

(56) References Cited

U.S. PATENT DOCUMENTS

| | | | | |
|---|---|---|---|---|
| 5,611,030 A | * | 3/1997 | Stokes .................. | 345/590 |
| 7,127,102 B2 | * | 10/2006 | Hiramatsu et al. .......... | 382/162 |
| 7,177,645 B2 | * | 2/2007 | Goldhamer ................ | 455/447 |
| 2005/0047648 A1 | * | 3/2005 | Newman et al. ............ | 382/162 |
| 2005/0047654 A1 | * | 3/2005 | Newman et al. ............ | 382/167 |
| 2006/0119870 A1 | * | 6/2006 | Ho et al. .................. | 358/1.9 |
| 2007/0052719 A1 | * | 3/2007 | Tin ........................... | 345/590 |
| 2007/0085855 A1 | * | 4/2007 | Tin ........................... | 345/590 |

OTHER PUBLICATIONS

U.S. Appl. No. 09/443,796, Newman et al., pending.

* cited by examiner

*Primary Examiner*—Wesner Sajous
(74) *Attorney, Agent, or Firm*—Fitzpatrick, Cella, Harper & Scinto

(57) ABSTRACT

The present invention provides for gamut mapping between a source device and a destination device, the destination device having a destination device black point with a hue, and the source device and the destination device being respectively characterized by a source gamut shell and a destination gamut shell. A lightness compression is performed using the source gamut shell, the destination gamut shell and the destination device black point. A constant lightness transformation is performed, wherein the constant lightness transformation modifies the destination gamut shell so that a shell boundary of the destination gamut shell on the hue plane containing the destination device black point is shifted from an original position to align with a neutral axis of the destination gamut shell. A chroma compression is performed using the source gamut shell and the modified destination gamut shell. An inverse constant lightness transformation is performed to obtain mapped colors for the destination device, wherein the inverse constant lightness transformation returns the shell boundary to the original position. As such, dark, almost neutral colors can be produced with virtually the highest possible density for the destination device.

11 Claims, 7 Drawing Sheets

BLACK ENHANCEMENT IN PERCEPTUAL GAMUT MAPPING

BACKGROUND OF THE INVENTION

1. Field of the Invention

The invention relates to the field of gamut mapping for color devices, and more particularly relates to gamut mapping between a source device and a destination device, the destination device having a destination device black point with a hue, and the source and destination devices being respectively characterized by a source gamut shell and a destination gamut shell.

2. Description of the Related Art

Gamut mapping is used to reproduce an image rendered by a source device on a destination device, since the source device and the destination device typically have different gamut boundaries with respect to each other. In other words, the gamut of colors that can be reproduced by the source device is typically not the same as the gamut of colors that can be reproduced by the destination device. Gamut mapping can be used to render the image from within the source device gamut boundary to within the destination device gamut boundary, so as to more accurately reproduce the color image on the destination device.

Gamut mapping of image data from one gamut to another is typically performed using a gamut mapping algorithm (GMA), which is a particular method of mapping color data between gamuts. In SGCK and similar GMAs, lightness compression and chroma compression are performed, usually in two separate steps. In performing lightness and chroma compression, a source gamut shell and a destination gamut shell, which respectively correspond to the borders of the gamuts for the source and destination devices, are typically used.

Lightness compression takes a source lightness range into a destination lightness range, with the source and destination lightness ranges being defined in terms of a neutral maximum lightness and a neutral minimum lightness. The concept of "neutral" is defined relative to the color appearance space used. For example, in the color appearance space of CAM02 with Jab coordinates, a color is neutral if a=b=0. It should be noted that a color may be neutral in one color appearance space and not neutral in another, and the same can be said even if the same color appearance model (CAM) is used, but with different initialization parameters for the CAM.

One use of the neutral maximum and minimum lightnesses is for initialization of a lightness scaler, which is typically applied to the input colors as well as the source gamut shell. The application of the lightness scaler to the source gamut shell brings the source gamut shell to the same place as the destination gamut shell.

One example of bringing the source gamut shell to the destination gamut shell is depicted in FIG. 1. In this drawing, $J_{max}$ represents the neutral maximum lightness while $J_{min}$ represents the neutral minimum lightness. As can be seen in FIG. 1, the source gamut shell and the destination gamut shell match at $J_{max}$ (i.e., the neutral maximum lightness), and also match at $J_{min}$ (i.e., the neutral minimum lightness). In this regard, the chroma compression algorithm, which is typically performed after lightness compression, relies on such matching geometry.

However, use of the neutral maximum and minimum lightnesses for initializing lightness scalers is not without problems. For example, when a printer is used as the destination device, the color with highest density can typically be obtained by outputting 100% inks, or by using maximum possible coverage if Gray Component Replacement (GCR)/ink limiting is in effect. However, this color does not usually correspond with the neutral minimum lightness in the color appearance space of the printer. One such example is shown in FIG. 2, which depicts that the device black point for the printer has a lower lightness than the printer's neutral minimum lightness in color appearance space.

As such, if the neutral minimum lightness of the destination device is used as the minimum lightness (i.e., black), the resulting lightness scaler will likely map to a minimum lightness that is not the highest density achievable by the printer. Furthermore, in a case of reproducing images from a monitor to a printer, the monitor black (i.e., R=G=B=0) will likely not be printed with the highest density possible by the printer. It is therefore likely that the image quality of the printer will lack depth and contrast when printing dark, almost neutral colors.

Accordingly, it is desirable for a GMA to print dark, almost neutral colors with the highest possible density for the destination device.

SUMMARY OF THE INVENTION

In view of the foregoing, the present invention provides for gamut mapping between a source device and destination device, which are respectively characterized by a source gamut shell and a destination gamut shell. A lightness compression using the destination device black point instead of the neutral minimum lightness is first performed. Then, a constant lightness transformation is performed which modifies the destination gamut shell so that a shell boundary thereof on a hue plane containing the destination device black point is shifted from an original position to align with a neutral axis of the destination gamut shell. Chroma compression is performed. An inverse constant lightness transformation is performed, wherein the inverse constant lightness transformation returns the shell boundary to the original position. As such, dark, near-neutral colors can be reproduced with increased and/or maximum density on the destination device, resulting in improved depth and increased contrast.

According to one aspect of the invention, gamut mapping is performed between a source device and a destination device, the destination device having a destination device black point with a hue, and the source device and the destination device being respectively characterized by a source gamut shell and a destination gamut shell. A lightness compression is performed using the source gamut shell, the destination gamut shell and the destination device black point. A constant lightness transformation is performed, wherein the constant lightness transformation modifies the destination gamut shell so that a shell boundary of the destination gamut-shell on the hue plane containing the destination device black point is shifted from an original position to align with a neutral axis of the destination gamut shell. A chroma compression is performed using the source gamut shell and the modified destination gamut shell. An inverse constant lightness transformation is performed to obtain mapped colors for the destination device, wherein the inverse constant lightness transformation returns the shell boundary to the original position.

The neutral axis can intersect the source gamut shell and the destination gamut shell. The neutral axis can also intersect the source gamut shell at a neutral maximum lightness and at a neutral minimum lightness, and the neutral axis can intersect the destination gamut shell at a neutral maximum lightness and at a neutral minimum lightness. In addition, the neutral minimum lightness and neutral maximum lightness of the source gamut shell can match those of the destination gamut shell following performance of the lightness compression and the constant lightness transformation.

The shell boundary can include all points between the neutral axis and the destination device black point, inclusive. The color appearance space can be CAM02, which can use Jab/Jch coordinates.

The destination gamut shell can be modified using the following transformation:

$$\chi(J, a, b) = \begin{cases} (J, a, b) & \text{if } J \geq J_{neutralMin} \\ \left(J, a - \frac{J_{neutralMin} - J}{J_{neutralMin} - J_k} a_k, b - \frac{J_{neutralMin} - J}{J_{neutralMin} - J_k} b_k\right) & \text{if } J < J_{neutralMin} \end{cases}$$

where $J_k a_k b_k$ are the Jab coordinates of the destination device black point and $J_{neutralMin}$ is the neutral minimum lightness of the destination gamut shell.

The transformation can be applied to Jab as a whole, rather than only the hue plane containing the destination device black point.

The inverse constant lightness transformation can be performed as follows:

$$\chi^{-1}(J, a, b) = \begin{cases} (J, a, b) & \text{if } J \geq J_{neutralMin} \\ \left(J, a + \frac{J_{neutralMin} - J}{J_{neutralMin} - J_k} a_k, b + \frac{J_{neutralMin} - J}{J_{neutralMin} - J_k} b_k\right) & \text{if } J < J_{neutralMin} \end{cases}$$

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE INVENTION

Figure 1:
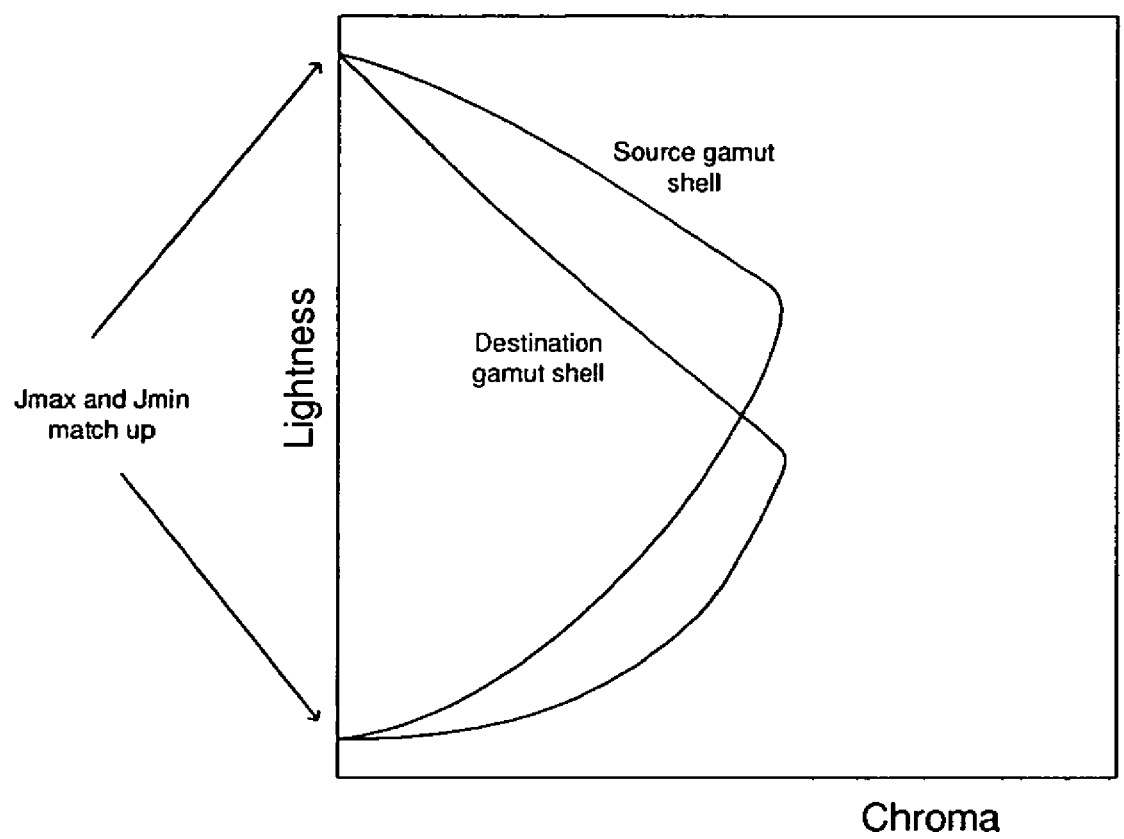
FIG. 1 is a diagram that provides one example of source and destination gamut shells have matching maximum and minimum lightnesses after lightness compression is performed.
Figure 2:
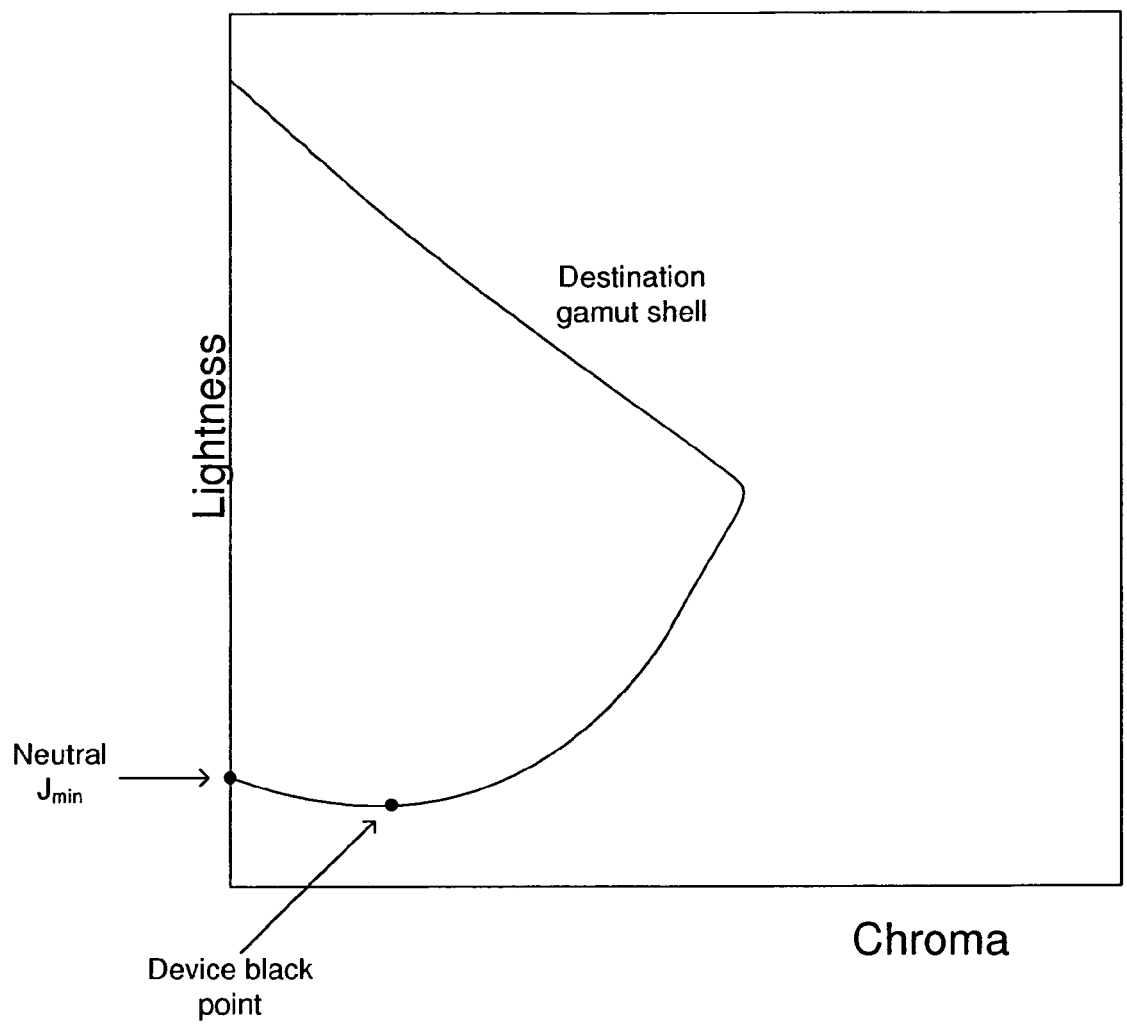
FIG. 2 is a diagram that provides an example in which the device black point for a destination device has a higher density than the neutral minimum lightness of the destination device.
Figure 3:
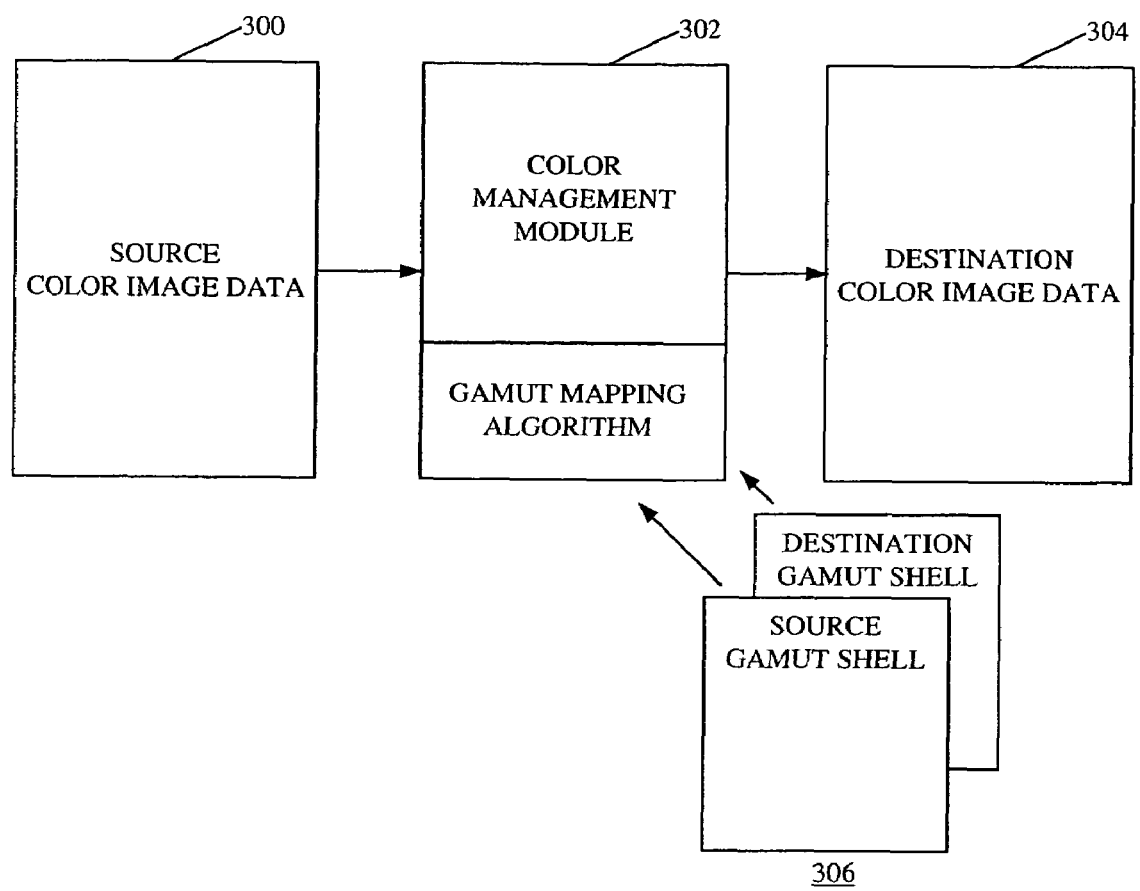
FIG. 3 is a diagram that provides a general explanation of a color management process in which a color management module uses a gamut mapping algorithm in accordance with an exemplary embodiment of the invention.

Referring to FIG. 3, a diagram that provides a general explanation of a color management process in which a color management module uses a gamut mapping algorithm, in accordance with an exemplary embodiment of the invention, is shown. As seen in FIG. 3, color management module 302 includes a gamut mapping algorithm which accesses source and destination gamut shells 306 corresponding to a source device and a destination device. The source device generates source color image data 300, and the destination device produces color image data 304 which corresponds to the generated source color image data 300.

Lightness compression and chroma compression are performed in the gamut mapping algorithm. Between lightness compression and chroma compression, a constant lightness transformation is performed to the effect that the destination gamut shell is modified so that a shell boundary of the destination gamut shell on a hue plane containing the device black point of the destination device is aligned with a neutral axis of the destination gamut shell. As a result, the source gamut shell and the destination gamut shell have matching neutral maximum lightnesses and matching neutral minimum lightnesses. The chroma compression algorithm, which relies on such matching, can therefore be more properly performed.

The lightness compression, constant lightness transformation and chroma compression steps allow for matrices and look-up tables to be derived which more properly map the colors of source color image data 300 into the desired areas of the gamut boundary of the destination color device, thereby generating destination color image data 304. Accordingly, the gamut mapping algorithm of this representative embodiment is seen to achieve an improved and desirable reproduction of color image data, especially for black colors.

Figure 4:
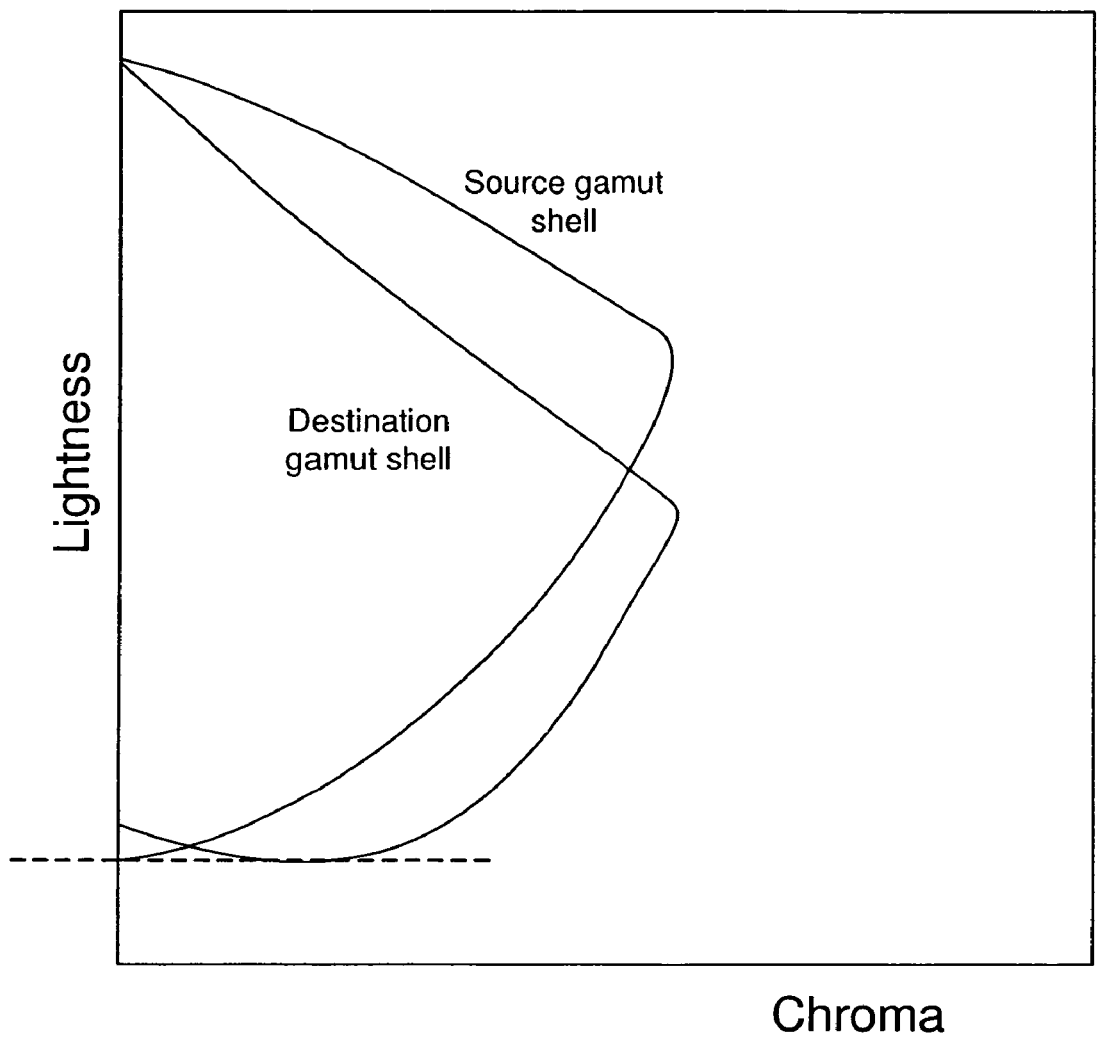
FIG. 4 is a diagram that provides an example of applying a lightness scaler to a source gamut shell, where the lightness scaler is constructed using the device black point of the destination device as the minimum lightness of the destination device.

FIG. 4 illustrates an example of applying a lightness scaler to a source gamut shell, where the lightness scaler is constructed using the device black point of the destination device as the minimum lightness of the destination device. In this example, CAM02, which uses Jab/JCh coordinates, was used as the color appearance space.

The device black point for the destination device in FIG. 4 can be set to $J_k a_k b_k / J_k C_k h_k$, with the hue plane corresponding to $h_k$. If $C_k$ is not 0, then the destination device black point is not neutral relative to CAM02. Furthermore, if $J_k$ is used for the destination minimum lightness in the construction of the lightness scaler, and if the resulting lightness scaler is applied to the source gamut shell, then it can be seen in FIG. 4 that the source gamut shell and the destination gamut shell do not have matching neutral minimum lightnesses. This can be problematic for chroma compression, which typically relies on a geometry in which the source and destination gamut shells have matching neutral minimum lightnesses and matching neutral maximum lightnesses.

Figure 5:
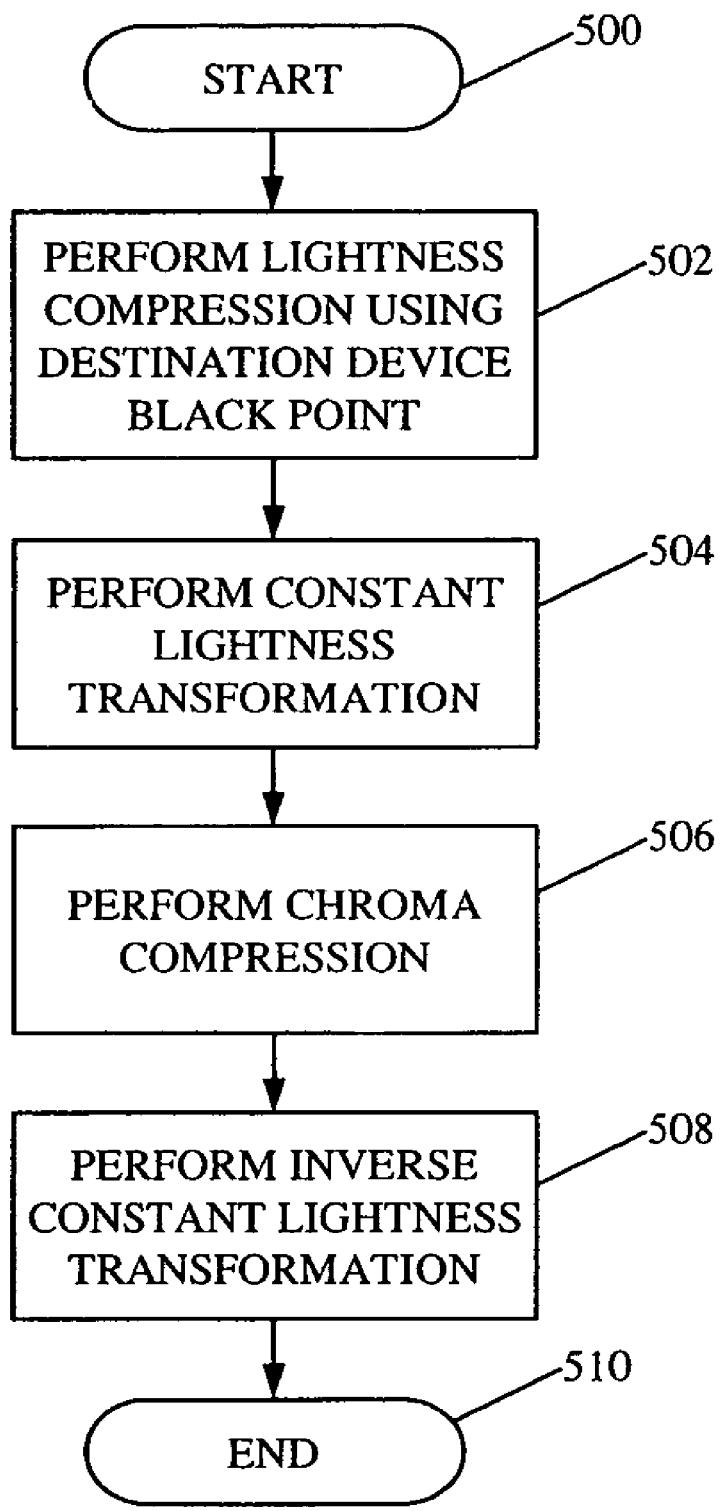
FIG. 5 is a flowchart depicting gamut mapping between a source device and a destination device, in accordance with a representative embodiment of the invention.

FIG. 5 is a flowchart depicting gamut mapping between a source device and a destination device, in accordance with a representative embodiment of the invention. Following start bubble 500, lightness compression is performed using the source gamut shell, the destination gamut shell and the destination device black point (block 502). However, in order to allow the subsequent chroma compression algorithm to proceed properly, the lightness compression is followed by a constant lightness transformation, which aligns the neutral maximum and minimum lightnesses of the source and destination gamut shells with each other (block 504).

Such alignment of neutral maximum lightnesses and the neutral minimum lightnesses can be achieved by adjusting the destination gamut shell between the range $J_{neutralMin}$ and $J_k$, inclusive. The adjustment is done by shifting points within this range leftwards. Furthermore, the transformation should be applied on the whole Jab space, and not necessarily just on the hue plane corresponding to $h_k$.

The transformation, $\chi$, can be performed as follows:

$$\chi(J, a, b) = \begin{cases} (J, a, b) & \text{if } J \geq J_{neutralMin} \\ \left(J, a - \frac{J_{neutralMin} - J}{J_{neutralMin} - J_k} a_k, b - \frac{J_{neutralMin} - J}{J_{neutralMin} - J_k} b_k \right) & \text{if } J < J_{neutralMin} \end{cases}$$

As can be seen in the above equation, the transformation has no effect when values of J are greater than or equal to $J_{neutralMin}$. The transformation is only effective when values of J are less than $J_{neutralMin}$. As such, the destination gamut shell is adjusted between $J_{neutralMin}$ and $J_k$, by shifting points within that region to the left.

Figure 6:
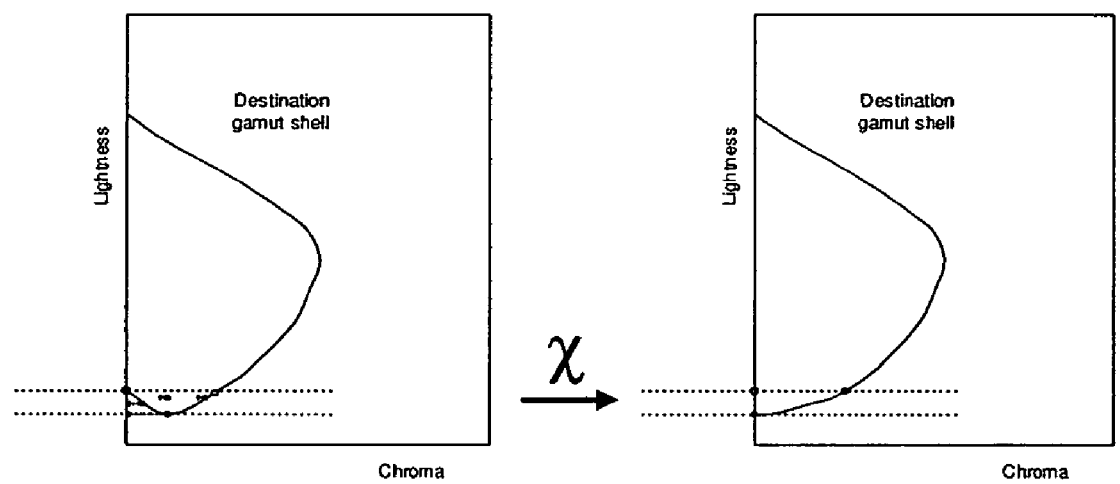
FIG. 6 is a diagram illustrating one example of modifying the destination gamut shell so that a shell boundary of the destination gamut shell on the hue plane containing the destination device black point is aligned with a neutral axis of the destination gamut shell.

FIG. 6 depicts an example of such shifting of points. More particularly, FIG. 6 is a diagram depicting one example of modifying the destination gamut shell so that a shell boundary of the destination gamut shell on the hue plane containing the destination device black point is aligned with a neutral axis of the destination gamut shell. As can be seen in this drawing, points between $J_{neutralMin}$ and $J_k$ are modified so as to align with the neutral axis.

Following the constant transformation, and referring back to FIG. 5, a chroma compression algorithm is performed (block 506). An inverse constant lightness transformation is then performed, to obtain the final mapped colors for the destination device (block 508). In performing the inverse constant lightness transformation, points between $J_{neutralMin}$ and $J_k$, inclusive, are returned to their original positions.

The inverse constant lightness transformation, $\chi^{-1}$, can be performed as follows:

$$\chi^{-1}(J, a, b) = \begin{cases} (J, a, b) & \text{if } J \geq J_{neutralMin} \\ \left(J, a + \frac{J_{neutralMin} - J}{J_{neutralMin} - J_k} a_k, b + \frac{J_{neutralMin} - J}{J_{neutralMin} - J_k} b_k \right) & \text{if } J < J_{neutralMin} \end{cases}$$

The inverse constant lightness transformation is followed by end bubble 510.

Thus, by adjusting points between $J_{neutralMin}$ and $J_k$ before chroma compression, and returning those points to their original positions following chroma compression, dark, near-neutral colors will likely be reproduced on the destination device with maximum density. Such reproduction results in improved depth and increased contrast. Moreover, since the adjustment is only applied to a thin lightness slab between neutral $J_{neutralMin}$ and $J_k$, the quality of lighter colors is not seen to be impacted.

Figure 7:
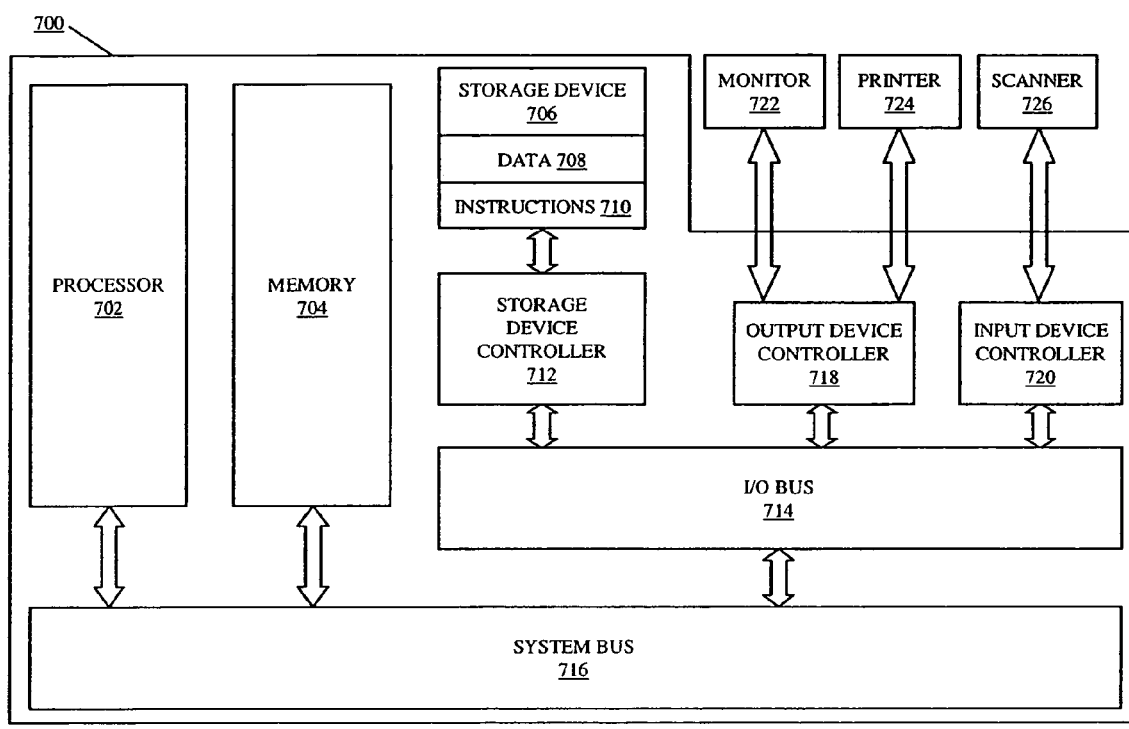
FIG. 7 is an architecture diagram for a data processing apparatus, such as a general purpose computing machine, suitable for hosting a process for gamut mapping in accordance with a representative embodiment of the present invention.

FIG. 7 is an architecture diagram for a data processing system, such as a general purpose computing machine, suitable for hosting a process for gamut mapping between a source device and a destination device in accordance with a representative embodiment of the present invention. The data processing system 700 includes a processor 702 coupled to a memory 704 via system bus 716. The processor 702 is also coupled to external Input/Output (I/O) devices via the system bus 716 and an I/O bus 714. A storage device 706 having computer system readable media is coupled to the processor 702 via a storage device controller 712, the I/O bus 714 and the system bus 716. The storage device 706 is used by the processor 702 to store and read data 708 and program instructions 710 used to implement gamut mapping between a source device and a destination device as described above. The processor 702 may be further coupled to color output devices, such as computer display 722 and color printer 724, via an output device controller 718 coupled to the I/O bus 714. The processor 702 may also be coupled to a color input device 726, such as color scanner, via an input device controller 720.

In operation, the processor 702 loads the program instructions from the storage device 706 into memory 704. The processor 702 then executes the loaded program instructions 710 to perform gamut mapping between a source device and a destination device. The resulting color can be used, for example, by the printer 724, as described above.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A method for gamut mapping between a source device and a destination device, the destination device having a destination device black point with a hue, and the source device and the destination device being respectively characterized by a source gamut shell and a destination gamut shell, the method comprising the steps of:
   performing a lightness compression using the source gamut shell, the destination gamut shell and the destination device black point,
   performing a constant lightness transformation, wherein the constant lightness transformation modifies the destination gamut shell so that a shell boundary of the destination gamut shell on the hue plane containing the destination device black point is shifted from an original position to align with a neutral axis of the destination gamut shell;
   performing a chroma compression using the source gamut shell and the modified destination gamut shell; and
   performing an inverse constant lightness transformation to obtain mapped colors for the destination device, wherein the inverse constant lightness transformation returns the shell boundary to the original position.

2. A method according to claim 1, wherein the neutral axis intersects the source gamut shell and the destination gamut shell.

3. A method according to claim 2, wherein the neutral axis intersects the source gamut shell at a neutral maximum lightness and at a neutral minimum lightness, and wherein the neutral axis intersects the destination gamut shell at a neutral maximum lightness and at a neutral minimum lightness, and wherein the neutral minimum lightness and neutral maximum lightness of the source gamut shell match those of the destination gamut shell following performance of the lightness compression and the constant lightness transformation.

4. A method according to claim 1, wherein the shell boundary includes all points between the neutral axis and the destination device black point, inclusive.

5. A method according to claim 1, wherein the color appearance space is CAM02, and uses Jab/Jch coordinates.

6. A method according to claim 5, wherein the destination gamut shell is modified using the following transformation:

$$\chi(J, a, b) = \begin{cases} (J, a, b) & \text{if } J \geq J_{neutralMin} \\ \left(J, a - \dfrac{J_{neutralMin} - J}{J_{neutralMin} - J_k} a_k, b - \dfrac{J_{neutralMin} - J}{J_{neutralMin} - J_k} b_k\right) & \text{if } J < J_{neutralMin} \end{cases}$$

where $J_k a_k b_k$ are the Jab coordinates of the destination device black point and $J_{neutralMin}$ is the neutral minimum lightness of the destination gamut shell.

7. A method according to claim 6, wherein the transformation is applied to Jab as a whole, rather than only the hue plane containing the destination device black point.

8. A method according to claim 5, wherein the inverse constant lightness transformation is performed as follows:

$$\chi^{-1}(J, a, b) = \begin{cases} (J, a, b) & \text{if } J \geq J_{neutralMin} \\ \left(J, a + \dfrac{J_{neutralMin} - J}{J_{neutralMin} - J_k} a_k, b + \dfrac{J_{neutralMin} - J}{J_{neutralMin} - J_k} b_k\right) & \text{if } J < J_{neutralMin} \end{cases}$$

9. A color management module which converts source color image data associated with a source color device to destination color image data associated with a destination color device using gamut mapping, wherein the gamut mapping is performed by a method according to claim 1.

10. Computer-executable process steps stored on a computer readable medium, the computer-executable process steps for gamut mapping between a source device and a destination device, the destination device having a destination device black point with a hue, and the source device and the destination device being respectively characterized by a source gamut shell and a destination gamut shell, the computer-executable process steps comprising process steps executable to perform a method according to claim 1.

11. An apparatus for gamut mapping between a source device and a destination device, the destination device having a destination device black point with a hue, and the source device and the destination device being respectively characterized by a source gamut shell and a destination gamut shell, the apparatus comprising:

a program memory for storing process steps executable to perform a method according to claim 1; and a processor for executing the process steps stored in the program memory.

\* \* \* \* \*